US010943155B2

(12) United States Patent
Liu et al.

(10) Patent No.: US 10,943,155 B2
(45) Date of Patent: Mar. 9, 2021

(54) SYSTEM OF RECOGNIZING IDENTITY OF OBJECT AND METHOD OF AUTOMATICALLY RECOGNIZING IDENTITY OF OBJECT

(71) Applicant: Delta Electronics, Inc., Taoyuan (TW)

(72) Inventors: Yin-Chang Liu, Taoyuan (TW); Hsuan-Lin Cheng, Taoyuan (TW); Chih-Wei Wang, Taoyuan (TW); Chun-Yi Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 42 days.

(21) Appl. No.: 16/385,482

(22) Filed: Apr. 16, 2019

(65) Prior Publication Data
US 2019/0340472 A1 Nov. 7, 2019

(30) Foreign Application Priority Data

May 4, 2018 (CN) .......................... 201810418822.X

(51) Int. Cl.
*G06K 9/00* (2006.01)
*G06K 9/62* (2006.01)
(Continued)

(52) U.S. Cl.
CPC ....... *G06K 9/6289* (2013.01); *G06K 9/00362* (2013.01); *G06K 9/00771* (2013.01);
(Continued)

(58) Field of Classification Search
CPC .......... G06K 9/00362; G06K 9/00771; G06K 9/3241; G06K 9/6289; G06T 2207/20021;
(Continued)

(56) References Cited

U.S. PATENT DOCUMENTS 7,561,717 B2 * 7/2009 Anderson .......... G06K 17/0022
382/101
8,816,855 B2 * 8/2014 Kreiner .................. G06K 17/00
340/572.1
(Continued)

FOREIGN PATENT DOCUMENTS

TW 201123038 A 7/2011
TW M512176 U 11/2015

OTHER PUBLICATIONS

Office Action dated Jul. 17, 2019 of the corresponding Taiwan patent application No. 107115148.

*Primary Examiner* — Ian L Lemieux
(74) *Attorney, Agent, or Firm* — Chun-Ming Shih; HDLS IPR Services

(57) ABSTRACT

A system of recognizing identity of object and method of automatically recognizing identity of object are provided. The method is to shoot a monitoring region for obtaining a monitoring image, recognize an object image in the monitoring image, scan the monitoring region for retrieving each identity data of each wireless badge, determines each image position of each object image in the monitor region, determine each badge position of each wireless badge in the monitor region, and link the object image and the identity data together when the positions match with each other. The system can pair the object image with the identity data instantly, determine whether the object is unregistered, and effectively save the time and human resources required by artificially pairing the object images with the identity data.

14 Claims, 9 Drawing Sheets

(51) Int. Cl.
*G06T 7/73* (2017.01)
*G07C 9/25* (2020.01)

(52) U.S. Cl.
CPC ................ *G06T 7/74* (2017.01); *G07C 9/253* (2020.01); *G06T 2207/20021* (2013.01); *G06T 2207/30196* (2013.01); *G06T 2207/30232* (2013.01)

(58) Field of Classification Search
CPC . G06T 2207/30196; G06T 2207/30232; G06T 7/74; G07C 2209/63; G07C 9/253; G07C 9/28
See application file for complete search history.

(56) References Cited

U.S. PATENT DOCUMENTS

| | | | | |
|---|---|---|---|---|
| 2004/0164858 | A1* | 8/2004 | Lin | G06K 9/00771 340/522 |
| 2009/0055205 | A1* | 2/2009 | Nguyen | G06K 9/00771 463/29 |
| 2010/0013924 | A1* | 1/2010 | Hasegawa | G08G 1/0175 348/143 |
| 2011/0150273 | A1* | 6/2011 | Moore | G06K 9/00664 382/103 |
| 2012/0105267 | A1* | 5/2012 | DeLia | G01V 8/005 342/22 |
| 2014/0379296 | A1* | 12/2014 | Nathan | G06Q 10/08 702/150 |
| 2015/0023562 | A1* | 1/2015 | Moshfeghi | G06T 7/292 382/106 |
| 2019/0043281 | A1* | 2/2019 | Aman | B60R 21/01512 |
| 2019/0182790 | A1* | 6/2019 | Kothari | G06T 7/20 |

* cited by examiner

SYSTEM OF RECOGNIZING IDENTITY OF OBJECT AND METHOD OF AUTOMATICALLY RECOGNIZING IDENTITY OF OBJECT

BACKGROUND OF THE INVENTION

Field of the Invention

The technical field relates to a system and a method, and more particularly related to a system of recognizing identity of object and a method of automatically recognizing identity of object.

Description of Related Art

The monitoring system of the related art only enables to shoot a monitoring region and is unable to recognize the identity of a visitor, such that the administrator must determine whether there is any unidentified human shown in the screen of the monitoring region manually. Above scheme cost a lot of human resources.

A monitoring system enabling to detect visitor had been provided, this monitoring system may detect whether any visitor enters the monitoring region base on image recognition or an infrared sensor. However, above monitoring system is unable to recognize the identity of the human entering the monitoring region similarly.

Besides, a monitoring system based on data fusion technology had been provided currently. For applying the above monitoring system, the administrator must pair the identity data of each human with a facial image of the same human manually for establishing a pairing relationship. After pairing, above monitoring system can determine the identity of the captured facial image according to the established pairing relationship for determining whether the human entering the monitoring region has registered. However, above monitoring system must cost a lot of time and human resources for pairing in advance.

SUMMARY OF THE INVENTION

The present disclosed example is directed to a system of recognizing identity of object and a method of automatically recognizing identity of object having the ability of pairing an object with the object's wireless badge immediately based on positions of them.

One of the exemplary embodiments, a method of automatically recognizing identity of object, comprises following steps: retrieving a monitoring image by shooting a monitoring region with an image capture device, and recognizing an object image in the monitoring image; retrieving identity data of a wireless badge by scanning the monitoring region with a scanning device; determining an image position of the object image in the monitoring region; determining a badge position of the wireless badge in the monitoring region; and, determining whether the image position and the badge position match with each other.

One of the exemplary embodiments, a system of automatically recognizing identity of object, comprises: an image capture device used to shoot a monitoring region for obtaining a monitoring image; a scanning device used to scan the monitoring region for retrieving identity data of a wireless badge; and, a control device electrically connected to the image capture device and the scanning device. The control device comprises: an image-recognizing module configured to recognize an object image in the monitoring image; an image-positioning module configured to determine an image position in the monitoring region which the object image is located; a badge-positioning module configured to determine a badge position in the monitoring region which the wireless badge is located; and, a comparing module configured to determine whether the image position and the badge position match with each other.

The present disclosed example can instantly pair the object image with the identity data instantly, determine whether the object is unregistered, and effectively save the time and human resources required by artificially pairing the object images with the identity data.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

The present disclosed example discloses a system 10 of recognizing identity of object (hereinafter recognizing system 10 for abbreviation) based on data fusion technology, the said recognizing system 10 is used to perform a method of automatically recognizing identity of object (hereinafter recognizing method for abbreviation). The present disclosed example has an ability to retrieve an image position of each object and a badge position of a wireless badge carried by the object after the one or more object enters the monitoring region, pair the object image of each object image with the identity data of each wireless badge corresponding to the same object together according to the image position and the badge position. Thus, the present disclosed example can recognize the identity of each object entering the monitoring region automatically, and further store the pairing result for replacing with artificial pairing.

Please be noted that each of the wireless badges applied to the present disclosed example may be a small electronic device respectively carried by the different object, and store the identity data of the corresponding object. Above-mentioned identity data is unique and recognizable, so as to be used to distinguish the identity of each different object. For example, if the object is an employee, the identity data may be an employee ID. If the object is a pet, the identity data may be a set of identification codes of the implanted microchip. Moreover, the wireless badge comprises one or more related component for receiving and emitting wireless signal, so as to wirelessly communicate with one or more external device (such as a scanning device 12 described later).

Figure 1:
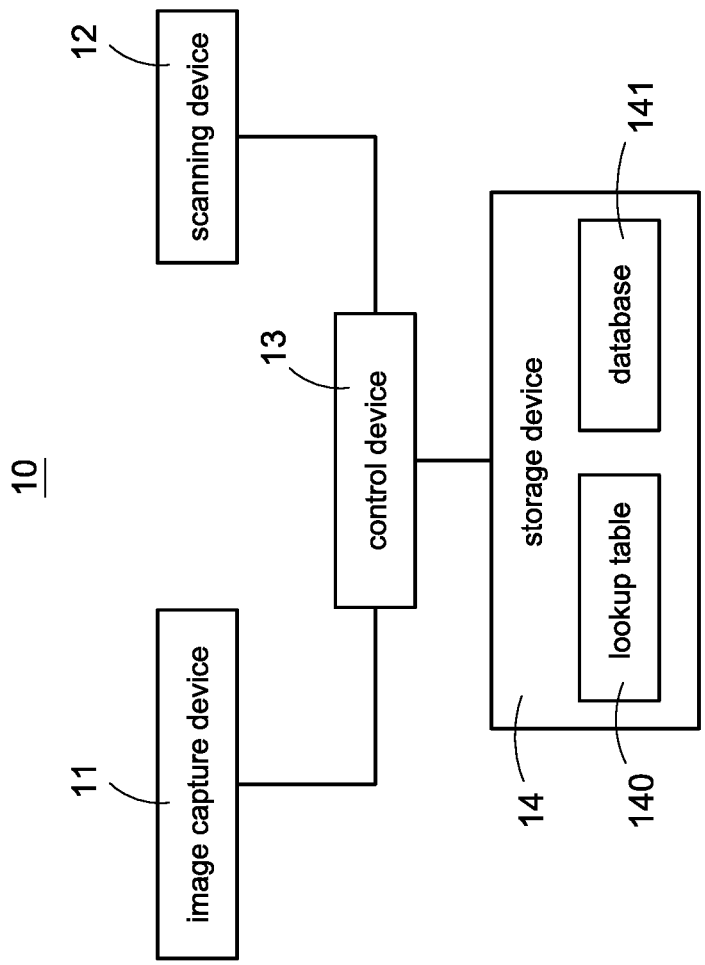
FIG. 1 is an architecture diagram of a system of recognizing identity of object according to a first aspect of the present disclosed example.

Please refer to FIG. 1, which is an architecture diagram of a system of recognizing identity of object according to a first aspect of the present disclosed example. The recognizing system 10 mainly comprises an image capture device 11, a scanning device 12, and a control device 13 electrically connected to above devices.

The image capture device 11 (such as camera) is used to shoot the monitoring region for obtaining a monitoring image. The scanning device 12 is used to induce the identity data stored in each wireless badge entering the monitoring region (such as name, employee ID, identity codes, chips number, property number or the other data being unique and recognizable).

One of the exemplary embodiments, the scanning device 12 may broadcast a scanning signal in the monitoring region continuedly after startup for inducing all of the wireless badges in the monitoring region. Each wireless badge in the monitoring region may respond above scanning signal to transmit back its identity data to the scanning device 12.

One of the exemplary embodiments, the scanning device 12 has an ability of positioning, and can determine a position in the monitoring region of each wireless badge.

For example, the scanning device 12 may comprise a point antenna module, the point antenna module comprises a plurality of antennas (may be arranged heading to the different direction), the monitoring region is divided into a plurality of sub-regions. The scanning device 12 is configured to induce the sub-regions by the antennas respectively. Thus, the scanning device 12 may configure the sub-region which any wireless badge is induced as the badge position of this wireless badge directly.

One of the examples, the scanning device 12 may comprise three or more omnidirectional antenna modules, each of the omnidirectional antenna modules is installed at the different positions of the monitoring region respectively. The scanning device 12 may induce the same wireless badge by each omnidirectional antenna module for receiving a response signal from the wireless badge. Then, the scanning device 12 may calculate each distance between the wireless badge and each omnidirectional antenna module according to the signal intensity in each response signal (such as the signal intensity of the response signal or the signal intensity of each scanning signal received by the wireless badge emitted from each omnidirectional antenna module), and calculate the position of the wireless badge in the monitoring region according to the arrangement positions of three or more omnidirectional antenna modules and the three or more calculated distances.

One of the exemplary embodiments, the scanning device 12 may be a RFID reader, a Bluetooth transceiver, a ZigBee transceiver, an ultrasonic transceiver or the other wireless transceiver. Moreover, the wireless badge is an electronic device with the same wireless communication technology, such as RFID tag, Bluetooth beacon, ZigBee transceiver, ultrasonic transceiver or the other wireless transceivers.

The control device 13 is used to control the recognizing system 10. More specifically, the control device 13 may determine a position of each object by image recognition technology, determine a position of each wireless badge by radio frequency technology, and pair the object and the wireless badge at the same position for determining the identity of each object in the monitoring region.

One of the exemplary embodiments, the control device 13 is configured to link the object image of the object and the identity data of the wireless badge carried by the same object for completion of pairing.

One of the exemplary embodiments, the recognizing system 10 further comprises a storage device 14 (such as a local storage or remote storage host) electrically connected to the control device 13. The storage device 14 is used to store data.

One of the exemplary embodiments, the storage device 14 further stores a lookup table 140. The lookup table 140 records a mapping relationship between the different positions (such as the different sub-regions) in the monitoring region and the scanning data (such as the different scanning configuration used to induce the wireless badge or the signal intensity corresponding to the wireless badge) of the scanning device 12.

One of the exemplary embodiments, the storage device 14 further store a database 11. The database 141 is used to record the object images and the identity data having been linked together.

One of the exemplary embodiments, the storage device 14 comprises a non-transient computer readable recording media, a computer program is recorded in the non-transient computer readable recording media. A plurality of computer readable codes are recorded in the computer program. The control device 13 may implement the recognizing method of the present disclosed example by execution of the computer-executable codes.

Figure 2:
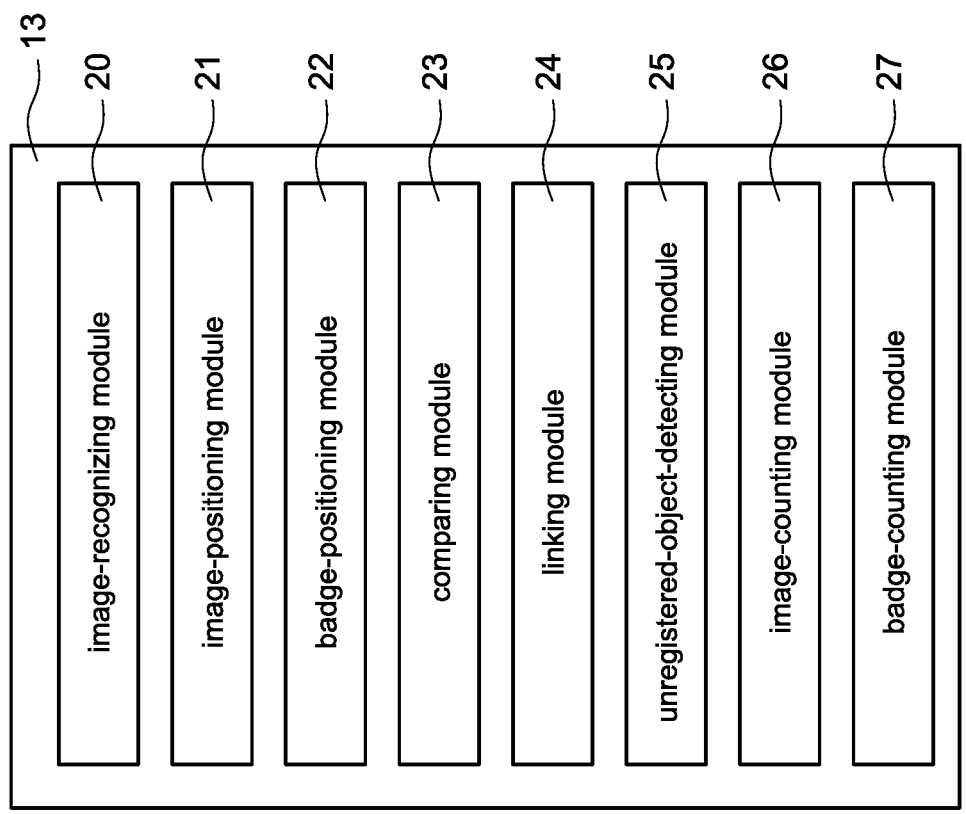
FIG. 2 is a detailed architecture diagram of a control device of the present disclosed example.

Please refer to FIG. 2 simultaneously, which is a detailed architecture diagram of a control device of the present disclosed example. More specifically, the control device 13 mainly controls the recognizing system 10 to implement each function of the recognizing method of the present disclosed example by execution of a computer program. Furthermore, the computer program comprises multiple modules of computer readable codes recorded in a non-volatile memory, the control device 13 may implement following functions by execution of each module of computer readable codes:

1. image-recognizing module 20, is configured to recognize an object image of an object in a monitoring image captured by the image capture device 11.

2. image-positioning module 21, is configured to determine an image position in the monitoring region that the recognized object image is located.

3. badge-positioning module 22, is configured to determine a badge position in the monitoring region that the wireless badge carried by the object is located.

4. comparing module 23, is configured to determine whether the determined image position and the determined badge position match with each other (such as being located at the same region).

5. linking module 24, is configured to link the object image and the identity data when the image position of the object image matches with the badge position of the wireless badge.

One of the exemplary embodiments, the linking module 24 may further store the linked object image and the identity data in the database 141.

6. unregistered-object-detecting module 25, is configured to determine that the object image is an unregistered object when the image position of any object image doesn't match with the badge positions of all of the wireless badges.

7. image-counting module 26, is configured to count a number of the object image recognized in the monitoring image.

8. badge-counting module 27, is configured to scan the monitoring region for counting a number of the wireless badges in the monitoring region.

One of the exemplary embodiments, the linking module 24 may directly link the object image and the identity data when both the number of the object image and the number of the wireless badge are one without determining whether the image position matches with the badge position by the image-positioning module 21, the badge-positioning module 22 and the comparing module 23.

One of the exemplary embodiments, the monitoring region is divided into a plurality of sub-regions, the image-positioning module 21 is configured to configure the sub-region which the object image is located as the image position. Moreover, the scanning device 12 executes induction on the sub-regions of the monitoring region respectively (such as inducing a part (such as one) of sub-regions each time) according to the scanning configurations for receiving the response signal comprising the identity data from the wireless badge located at any sub-region. The badge-positioning module 22 is configured to configure the sub-region which the wireless badge is induced as the badge position of the wireless badge. The linking module 24 is configured to link the object image and the identity data when the object image and the wireless badge are located at the same sub-region.

One of the exemplary embodiments, the scanning device 12 may receive a plurality of the response signals of the same wireless badge when inducing the different sub-regions. For example, when the scanning device 12 scans the sub-region nearby the wireless badge, it is possible that the wireless badge returns the response signal unexpectedly caused by spillover wave. Thus, the present disclosed example can configure the badge-positioning module 22 to only select the position corresponding to the response signal with the strongest signal intensity as the badge position, so as to prevent from error positioning and improve positioning accuracy.

One of the exemplary embodiment, the scanning device 12 may firstly execute the first time scanning on the sub-regions of the monitoring region for retrieving a plurality of first response signals returned from all of the wireless badges (each first response signal comprises the identity data of the wireless badge) in the monitoring region, and then execute the second time scanning individually on each sub-region according to each of a plurality of scanning configurations and the identity data of each wireless badge for retrieving a second response signal form each wireless badge individually. Then, the scanning device 12 may record a signal intensity related to each received second response signal after reception of each second response signal and/or the scanning configuration used when reception of the second response signal. The signal intensity related to each received second response signal may be the signal intensity of the scanning signal received by each wireless badge during the second time scanning and sent from the scanning device 12 (the wireless badge may record this signal intensity in the second response signal) or the signal intensity of each received second response signal. Moreover, the badge-positioning module 22 is configured to determine the sub-region which each wireless badge is located and make the determined sub-region as the badge position according to the lookup table 140 and the signal intensity corresponding to each wireless badge (or according to the lookup table 140 and the scanning configuration corresponding to each wireless badge).

One of the exemplary embodiments, the scanning device 12 is under a sleep mode, a standby mode, or the other low power consumption modes in most of the time. The image-recognizing module 20 triggers the scanning device 12 to switch to an operating mode for beginning to scan the monitoring region after an object image in the monitoring image is recognized. The present disclosed example can position the object images of all of the objects and the identity data of all of the wireless badges in the monitoring region, and pair them according to the relationships of their positions for detecting whether there is any unregistered object in the monitoring region.

Figure 3:
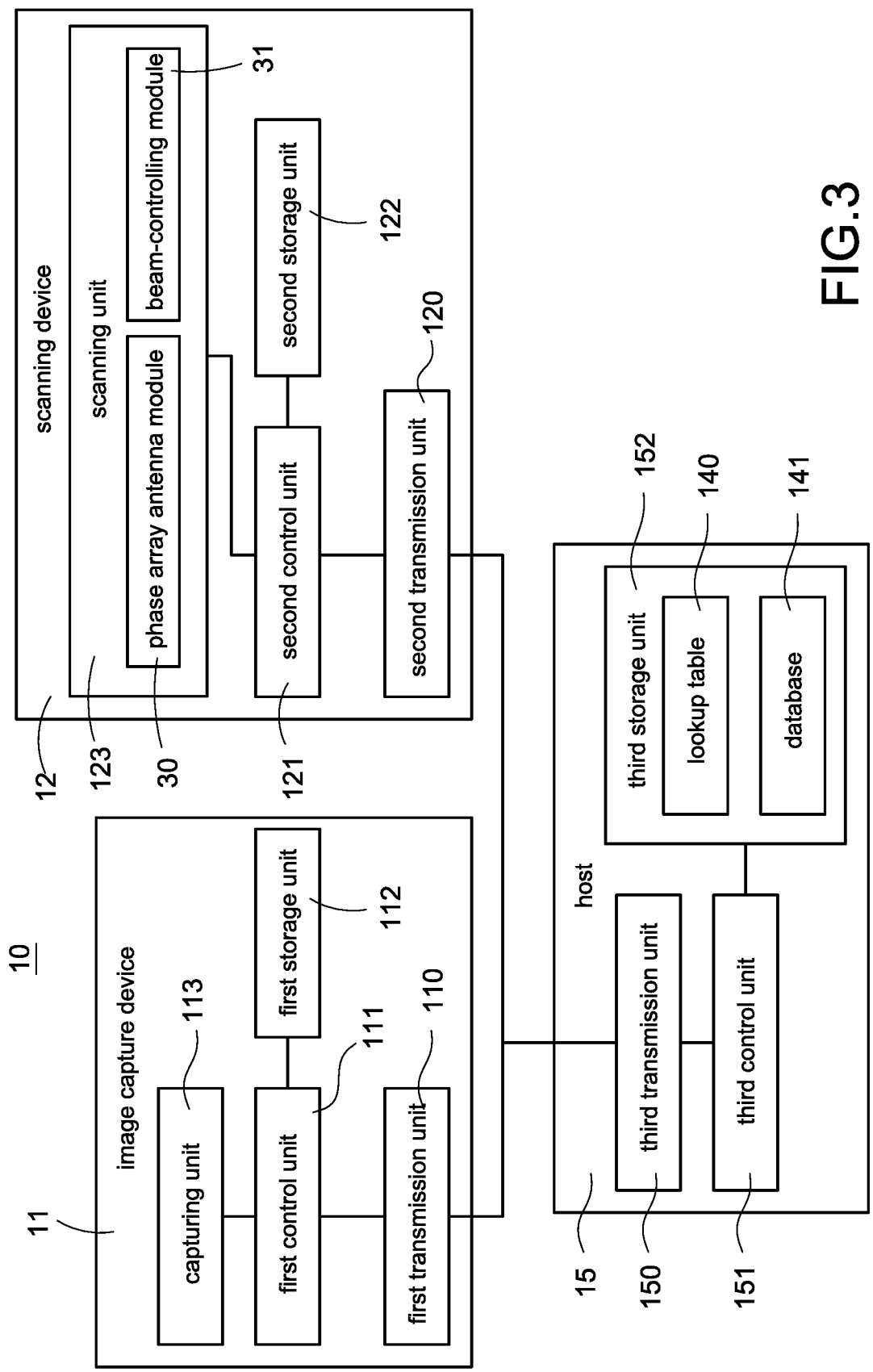
FIG. 3 is an architecture diagram of a system of recognizing identity of object according to a second aspect of the present disclosed example.

Please refer to FIG. 3, which is an architecture diagram of a system of recognizing identity of object according to a second aspect of the present disclosed example. In this embodiment, the recognizing system 10 further comprises a host 15.

Moreover, in this embodiment, the control device 13 comprises a first control unit 111 arranged on the image capture device 11, a second control unit 121 arranged on the scanning device 12 and a third control unit 151 arranged on the host 15. The storage device 14 comprises a first storage unit 112 arranged on the image capture device 11, a second storage unit 122 arranged on the scanning device 12 and a third storage unit 152 arranged on the host 15. Moreover, the lookup table 140 and the database 141 may be stored in the third storage unit 152.

On the other hand, when the control device 13 executes the computer program, the control device 13 may control the image capture device 11, the scanning device 12, and the host 15 to interact with each other for implementing the recognizing method of the present disclosed example.

In this embodiment, the image capture device 11 comprises a first transmission unit 110, a first storage unit 112, a capturing unit 113 and a first control unit 111 electrically connected to above units. The capturing unit 446 (such as a combination if image sensor and lens) is used to shoot the monitoring region for generating a monitoring image.

The scanning device 12 comprises a second transmission unit 120, a second storage unit 122, a scanning unit 123 and a second control unit 121 electrically connected to above units.

The scanning unit 123 is used to emit the scanning signals for making the wireless badges in the monitoring region be induced. One of the exemplary embodiments, the scanning unit 123 comprises a phase array antenna module 30 and a beam-controlling module 31. The phase array antenna module 30 comprises an antenna array, the phase array antenna module 30 emits the scanning (microwave) beam and receives the signal returned from each wireless badge (such as above-mentioned response signal) via the antenna array. The beam-controlling module 31 is connected to the phase array antenna module 30, and is configured to generate the scanning (microwave) beams according to the different identity data of the different wireless badges (only the wireless badge having the matched identity data would be induced by the scanning (microwave) beams and return the response signal), and control the phase array antenna module 30 to emit the scanning (microwave) beams respectively heading to the different scanning angles according to the different scanning configurations.

The host 15 comprises a third transmission unit 150, a third storage unit 152 and a third control unit 151 electrically connected to above units.

The first transmission unit 110, the second transmission unit 120 and the third transmission unit 150 may be the same type of data transmitters or the data transmitters compatible with each other (such as Wi-Fi network card, mobile network card, Bluetooth transmitter, Zigbee transmitter or the other wireless data transmitters, or network cable connector, USB connector, or the other wired data transmitters, so as to have an ability of communicating with each other.

One of the exemplary embodiments, the image capture device 11 is configured to transfer all of the captured monitoring images to the host 15, the scanning device 12 is configured to transfer all of the received response signals from the wireless badges (and scanning configurations) to the host 15. The host 15 is configured to execute recognition on the monitoring images for determining the image positions of all of the object images, determine the badge positions of all of the wireless badges according to the lookup table 140, the response signals (and the scanning configurations), and execute data-linking on them.

One of the exemplary embodiments, the image capture device 11 is configured to execute recognition on the captured monitoring image for determining the image positions of all of the object images, and transfer all of the determined image positions and the corresponding object images to the host 15. The scanning device 12 is configured to determine the badge positions of all of the wireless badges according to the lookup table 140 (may be stored in the second storage unit 122) and the response signals (and scanning configurations), and transfer all of the determines badge positions and the identity data of the corresponding wireless badge to the host 15. The host 15 executes data-linking on the object image and the identity data which are located at the same position.

Figure 4:
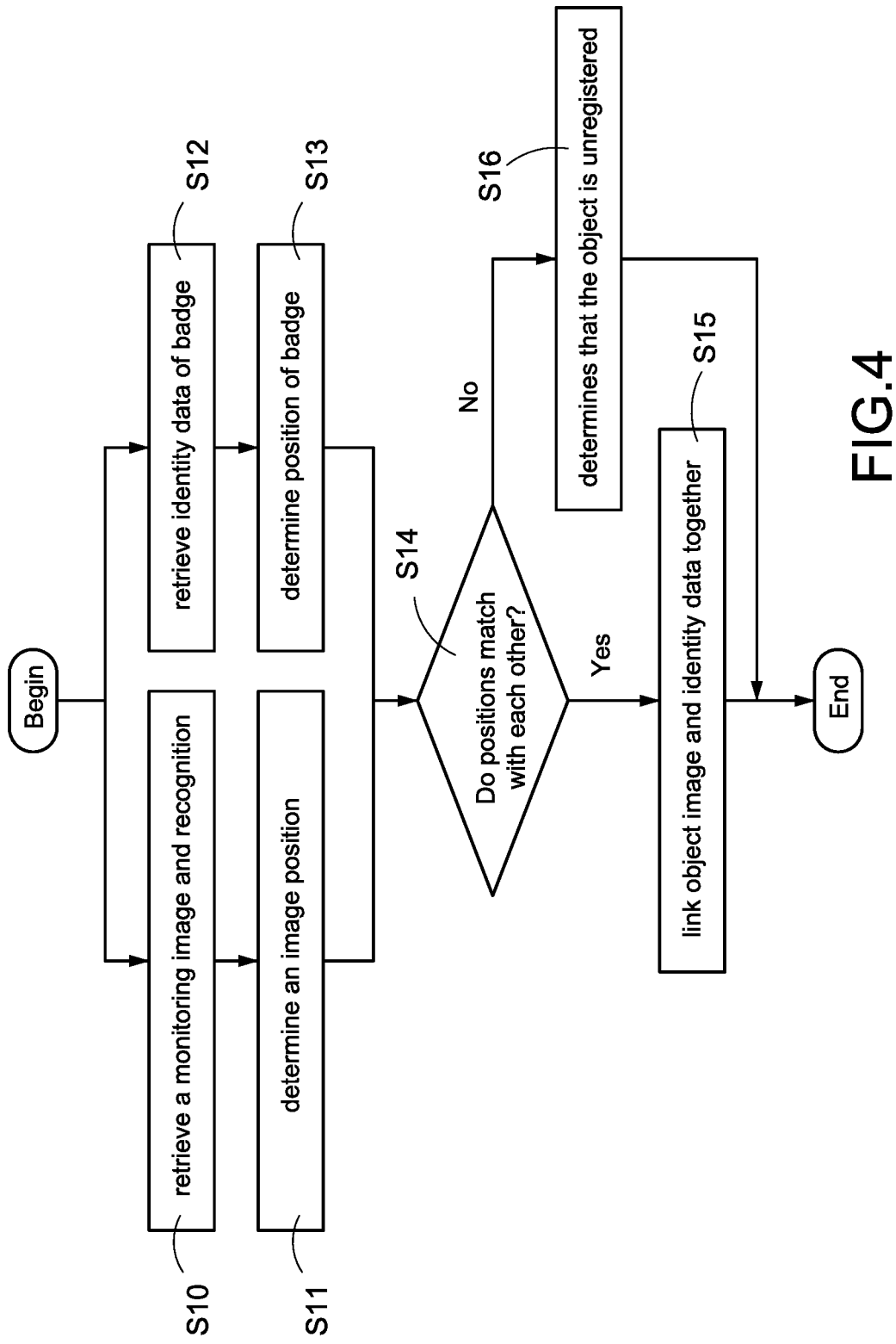
FIG. 4 is a flowchart of a method of automatically recognizing identity of object according to the first embodiment of the present disclosed example.

Please refer to FIG. 4 simultaneously, which is a flowchart of a method of automatically recognizing identity of object according to the first embodiment of the present disclosed example. The recognizing method of each embodiment of the present disclosed example may be implemented by the recognizing system 10 shown in FIG. 1, FIG. 2 or FIG. 3 (following embodiments take the recognizing system 10 shown in FIG. 1 and FIG. 2 for explaining). The recognizing method of this embodiment comprises following steps.

Step S10: the control device 13 (such as the first control unit 111) controls the image capture device 11 to shoot the monitoring region for obtaining a monitoring image, and recognizes the object image of each object entering the monitoring region by the image-recognizing module 20.

Step S11: the control device 13 (such as the first control unit 111 or the third control unit 151) determines the image position of each object image in the monitoring region by the image-positioning module 21.

One of the exemplary embodiments, the image capture device 11 shoots the monitoring region with a fixed focal length heading to a fixed angle, so as to make the monitoring images captured each time show the same range and view of the monitoring region. Moreover, the administrator may define the monitoring image in advance (such as respectively corresponding the different positions in the monitoring image to the different sub-regions of the reality monitoring region), and store the corresponding rules in the storage device 14 (such as the first storage unit 112 or the third storage unit 152). Thus, the control device 13 may determine the sub-region which the object is located according to the position (namely the image position) of each object image in the monitoring image and these corresponding rules.

During execution of step S10 to step S11, the control device 13 (such as the second control unit 121 and the third control unit 151) may execute step S12 to step S13 simultaneously. Step S12: the control device 13 (such as the second control unit 121) scanning the monitoring region by the scanning device 12 for retrieving the identity data of each wireless badge in the monitoring region.

Step S13: the control device 13 (such as the second control unit 121 or the third control unit 151) determines the badge position of each wireless badge in the monitoring region by the badge-positioning module 22.

One of the exemplary embodiments, the control device 13 (such as the second control unit 121) may calculate the distance between each wireless badge and the scanning device 12 according to the signal intensity and direction corresponding to the response signal of each wireless badge, and determine the sub-region (namely the badge position) which each wireless badge is located according to the calculated distance and the sub-region or the scanning angle which inducing each wireless badge.

Step S14: the control device 13 (such as the first control unit 111, the second control unit 121 or the third control unit 151) determines whether the image position of any object image matches with the badge position of any wireless badge by the comparing module 23, such as they are located at the same sub-region, or a distance between the image position and the badge position is less than a threshold distance.

If the control device 13 determines that the image position of any object image matches with the badge position of any wireless badge, the control device 13 performs the step S15.

If the control device 13 determines that the image position of any of object images do not match with the badge positions of all of wireless badge, the control device 13 performs the step S16.

Step S15: the control device 13 (such as the first control unit 111, the second control unit 121 or the third control unit 151) links the object image and the identity data which are located at the same position together by the linking module 24, and may further store the linked object image and the identity data in the database 141 (the database 141 may be stored in the first storage unit 112, the second storage unit 122 or the third storage unit 152).

One of the exemplary embodiments, the control device 13 firstly searches the linked object image in the database 141 according to the identity data (such as the other object images of the same object which are linked to the same identity data and stored in the database 141 or the object image inputted when the same object is registered), and links the object image and the identity data which are located at the same position together when determining that the searched object image matches with the captured object image (namely, they show the same object). Thus, the present disclosed example can effectively ensure that the linked object image and the linked identity data are correct, and improve the accuracy of identification.

One of the exemplary embodiments, the recognizing system 10 further comprises a human-machine interface (such as a display or a speaker) providing to the administrator for monitoring the monitoring region immediately, the control device 13 may issue an alarm by the human-machine interface when determining that the searched object image does not match the captured object image. Thus, the present disclosed example can effective detect whether there is any object in the monitoring region fraudulently use the wireless badge of another object.

Step S16: the control device 13 (such as the first control unit 111, the second control unit 121 or the third control unit 151) determines that the object image is an unregistered object by the unregistered-object-detecting module 25.

One of the exemplary embodiments, the control device 13 may further issue an alarm by the human-machine interface for reminding the administrator that there in the unregistered object in the monitoring region. Thus, the present disclosed example can effectively detect the unregistered object entering the monitoring region by following the registered object.

The present disclosed example can pair the corresponding objecting image and identity data immediately, detect the unregistered object immediately, and effectively save the time and human resources required by artificially pairing the object images with the identity data.

Please be noted that although the control device 13 is configured to perform step S10-S11 and step S12-13 simultaneously in this embodiment, but this specific example is not intended to limit the scope of the present disclosed example.

One of the exemplary embodiments, the control device 13 (such as the second control unit 121) is under the low power consumption modes in most of the time, and switches to the operating mode for inducing the wireless badge in the monitoring region when an object image in the monitoring region is discovered.

One of the exemplary embodiments, the recognizing system 10 may further comprise an object detector (such as PIR sensor, ultrasonic sensor, door magnetic sensors, etc.) electrically connected to the control device 13 (such as the first control unit 111 and the second control unit 121), the object detector is used to trigger a signal when sensing that an object enters the monitoring region. The control device 13 usually controls the image capture device 11 and the scanning device 12 to be under the low power consumption mode, and control the image capture device 11 and the scanning device 12 to switch to the operating mode for shooting the monitoring image and inducing the wireless badges in the monitoring region when receiving the trigger signal.

Figure 5:
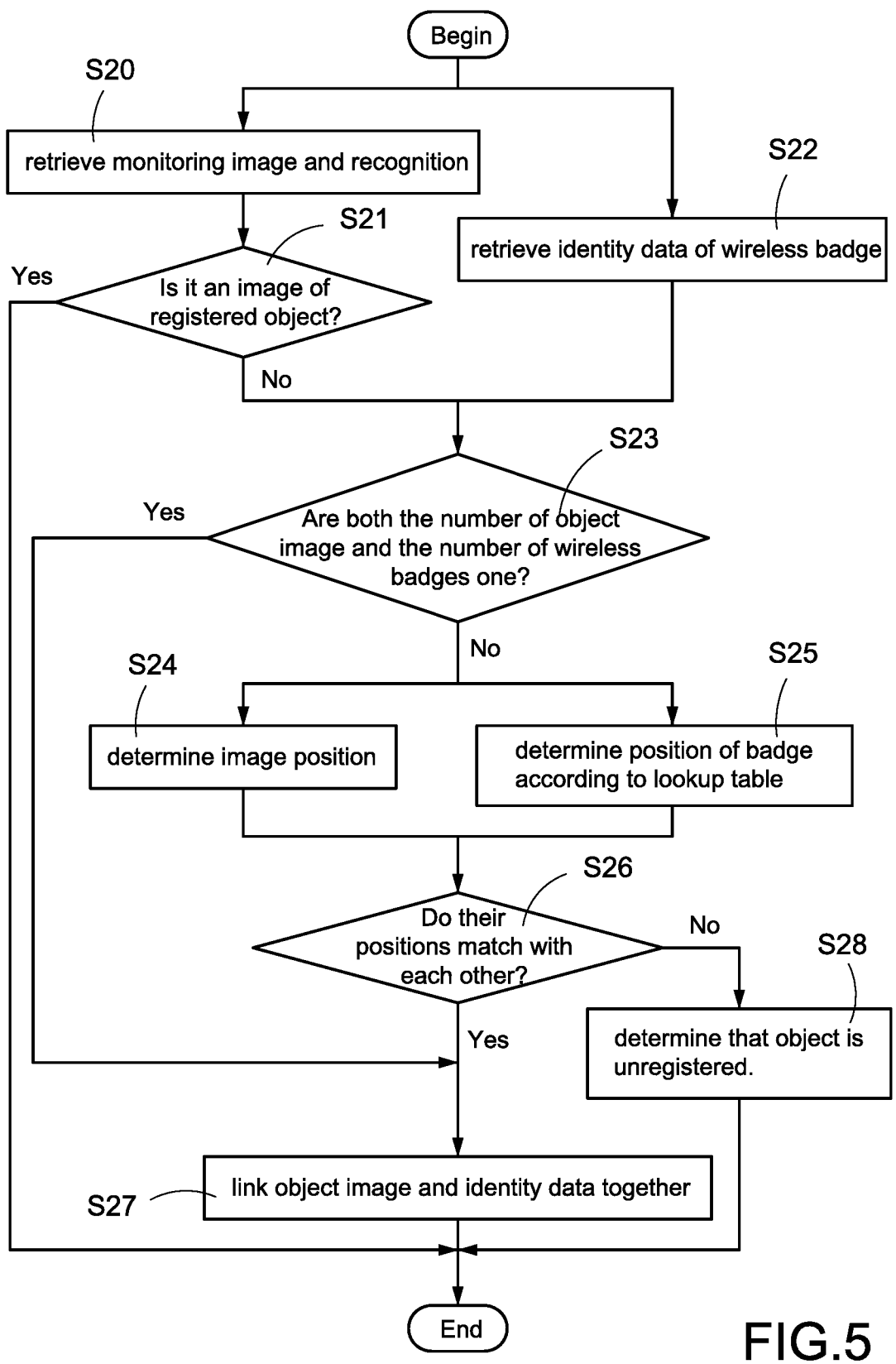
FIG. 5 is a flowchart of a method of automatically recognizing identity of object according to the second embodiment of the present disclosed example.

Please refer to FIG. 5, which is a flowchart of a method of automatically recognizing identity of object according to the second embodiment of the present disclosed example. The recognizing method of this embodiment of the present disclosed example may be implemented by the recognizing system 10 shown in FIG. 1, FIG. 2 or FIG. 3 (following embodiments take the recognizing system 10 shown in FIG. 2 and FIG. 3 for explaining). Moreover, the modules 20-27 shown in FIG. 2 may be implemented by the first control unit 111, the second control unit 121 and the third control unit 151 executing each module of computer readable cods. The recognizing method of this embodiment comprises following steps.

Step S20: the first control unit 111 of the image capture device 11 (namely the control device 3) controls the capturing unit 113 to capture the monitoring region, and recognizes the object image of each object by the image-recognizing module 20.

Step S21: the third control unit 151 of the host 15 (namely the control device 3) searches the database 141 stored in the third storage unit 152 according to the object image of each object, and determines whether any captured object image is the known object, such as the object having been linked or registered in advance.

If the third control unit 151 determines that any object image belongs to a known object (for example, there is the matched object image in the database 141 and the matched object image had been linked to the specific identity data), the third control unit 151 may directly confirm the identity of this object. Otherwise, the third control unit 151 performs step S23.

One of the exemplary embodiments, the third control unit 151 may further determine whether the identity data obtained from the database 141 matches with the identity data of the wireless badge located at the same position for detection of fraudulent use of the wireless badge.

During the image capture device 11 performing step S20 and the host performing step S21, the scanning device 12 may perform step S22 simultaneously. Step S22: the second control unit 121 of the scanning device 12 (namely the control device 3) scans the monitoring region by the scanning unit 123 for retrieving the identity data of each wireless badge in the monitoring region.

Step S23: the third control unit 151 of the host 15 counts a number of the object images (namely the number of the objects in the monitoring region) by the image-counting module 26, counts a number of a plurality of the identity data (namely the number of the wireless badges in the monitoring region) by the badge-counting module 27, and determine whether both the number of the object image and the number of the identity data are one.

If the third control unit 151 determines that both the number of the object image and the number of the identity data are one, this means that pairing can be executed directly without the positioning for object and wireless badge. Then, the third control units 151 performs step S27. Otherwise, the third control unit 151 performs step S24 and step S25 for paring each object image with each wireless badge.

Step S24: the third control unit 151 (namely the control device 3) determines the image position of each object image in the monitoring region by the image-positioning module 21.

The host 15 may performs step S25 simultaneously during execution of step S24. Step S25: the third control unit 151 of the host 15 retrieves the lookup table 140 from the third storage unit 152 (namely the storage device 14), and determines the sub-region (namely the badge position) which each wireless badge is located according to the signal intensity of the response signal of each wireless badge and the scanning configuration used to induce this wireless badge.

Step S26: the third control unit 151 determines whether the image position of any object image matches with the badge position of any wireless badge by the comparing module 23.

If the third control unit 151 determines that the image position of any object image matches with the badge position of any wireless badge, the third control unit 151 performs step S27.

If the third control unit 151 determines that the image position of each object image matches with the badge positions of all wireless badges, the third control unit 151 performs step S28.

Step S27: the third control unit 151 links the object image and identity data which have the matched position together by the linking module 24, and storage the linked data in the database 141.

Step S28: the third control unit 151 determines that the object image corresponds to an unregistered object by unregistered-object-detecting module 25.

Thus, the present disclosed example can implement identification of object identity quickly and immediately.

Please be noted that although the lookup table 140 and the database 141 is configured to be stored in the third storage unit 152 of the host 15 in above-mentioned embodiments and steps S21 to S28 are performed by the third control unit 151 of the host 15, but this specific example is not intended to limit the scope of the present disclosed example.

One of the exemplary embodiments, the lookup table 140 and the database 141 may be configured to be stored in the first storage unit 112 of the image capture device 11, the second storage unit 122 of the scanning device 12, or both of the first storage unit 112 and the second storage unit 122. Moreover, steps S21 to S27 are performed by the first control unit 111, the second control unit 121 or co-execution of the first control unit 111 and the second control unit 121.

Figure 6:
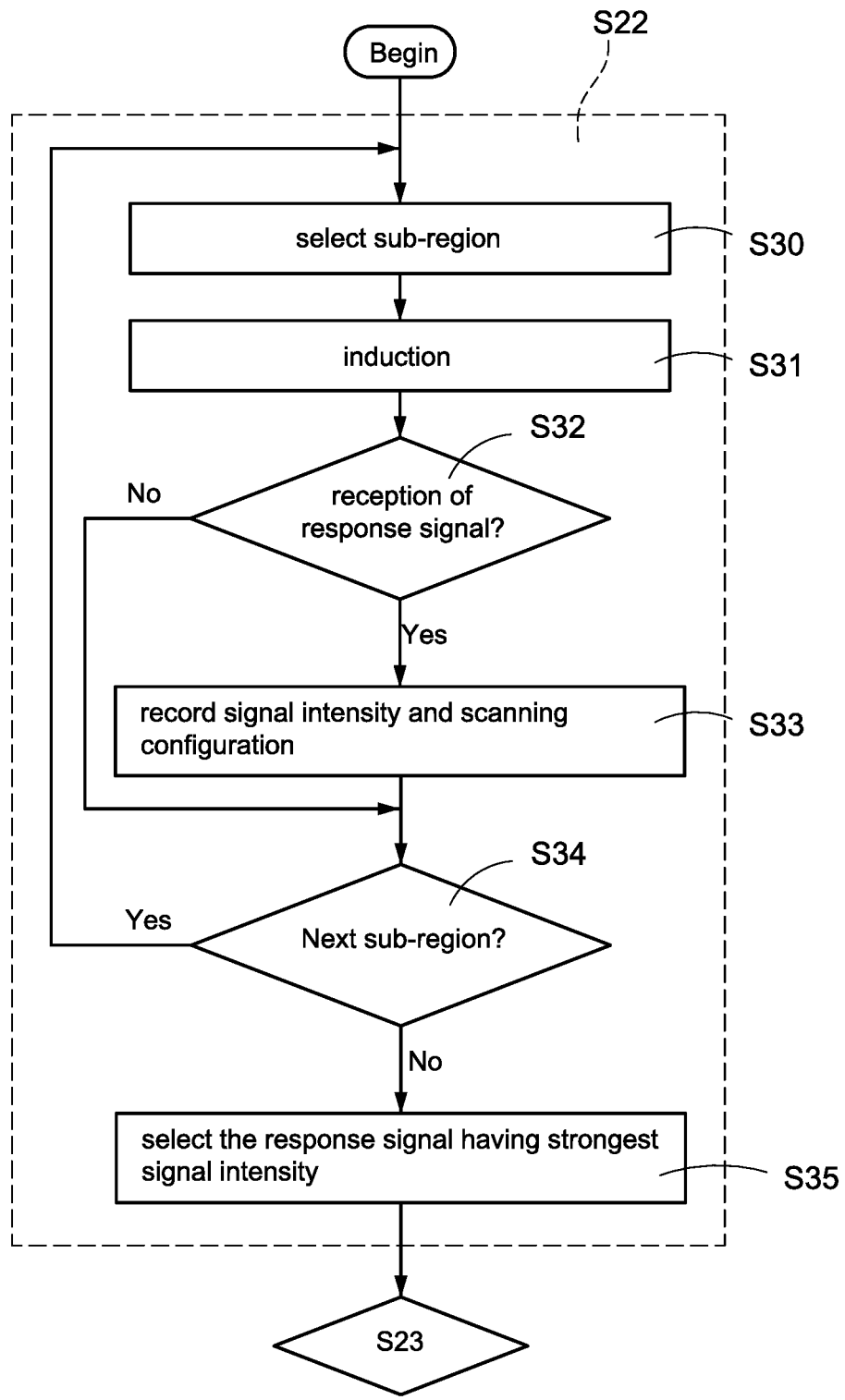
FIG. 6 is a partial flowchart of a method of automatically recognizing identity of object according to the third embodiment of the present disclosed example.

Please refer to FIG. 5 and FIG. 6 simultaneously, FIG. 6 is a partial flowchart of a method of automatically recognizing identity of object according to the third embodiment of the present disclosed example. In this embodiment, the monitoring region is divided into a plurality of sub-regions. The scanning device 12 is a phase array scanning device (as shown in FIG. 3), and enable to execute induction on the partial sub-regions (such as single sub-region or the sub-regions located at the same angle) for one time selectively.

Moreover, the scanning device 12 stores a plurality of scanning configurations, each scanning configuration respectively corresponds to partial subregion(s). The scanning device 12 may induce the wireless badge in the sub-region(s) corresponding to the used scanning configuration if scanning based on one of the scanning configurations.

Compare to the recognizing method shown in FIG. 5, step S22 of the recognizing method of this embodiment comprises following steps.

Step S30: the second control unit 121 of the scanning device 12 selects at least one of the sub-regions.

One of the exemplary embodiments, the second control unit 121 is configured to select one of the scanning configurations and select the sub-region(s) corresponding to the selected scanning configuration.

Step S31: the second control unit 121 executes induction on the selected sub-regions. One of the exemplary embodiments, the second control unit 121 controls the phase array antenna module 30 and the beam-controlling module 31 to emit scanning beam heading to designated angle or designated sub-region(s) according to the selected scanning configuration.

Moreover, when any wireless badge located at above-mentioned angle or sub-region(s) receives the scanning beam, the wireless badge may be induced by the scanning beam and return the response signal (second response signal) comprising the identity data.

Step S32: the second control unit 121 determines whether reception of a response signal from any wireless badge.

If the second control unit 121 determines that any response signal is received, the second control unit 121 performs step S33. Otherwise, the second control unit 121 performs step S34.

Step S33: the second control unit 121 records the signal intensity or scanning configuration (namely currently used scanning configuration) corresponding to the wireless badge according to the received response signal.

One of the exemplary embodiments, the wireless badge may compute the signal intensity of the received scanning signal after reception of the scanning signal sent in step, add the computed signal intensity (such as numerical value) to the response signal, and return the response signal to the scanning device 12.

Step S34: the second control unit 121 determines whether all of the sub-regions had been scanned completely, such as determining whether all of the scanning configurations had been selected and used.

If the second control unit 121 determines that all of the sub-regions had been scanned completely, the second control unit 121 performs step S35. Otherwise, the second control unit 121 performs step S30 again for selecting another sub-region (such as selecting another scanning configuration) to continue to scan.

Step S35: the second control unit 121 selects one of a plurality of response signals (such as selecting the response signal having the strongest signal intensity) returned from the same wireless badge (each response signal is received when respectively inducing on the different sub-region(s) or heading to the different angles). Then, step S23 is performed.

Please be noted that, in this embodiment, the lookup table 140 is configured to record a mapping relationship between each scanning configuration, the different signal intensities (ranges) and each sub-region. Step S25 is configured to search the lookup table 140 according to the signal intensity corresponding to the selected response signal and the currently used scanning configuration for obtaining the corresponding sub-region (namely badge position).

The present disclosed example can effectively determine the position of the wireless badge via phase array scanning device. Moreover, the present disclosed example can determine the position of the wireless badge with single scanning device via using the phase array scanning device, so as to deduce the cost of building the system and the occupied space.

Figure 7:
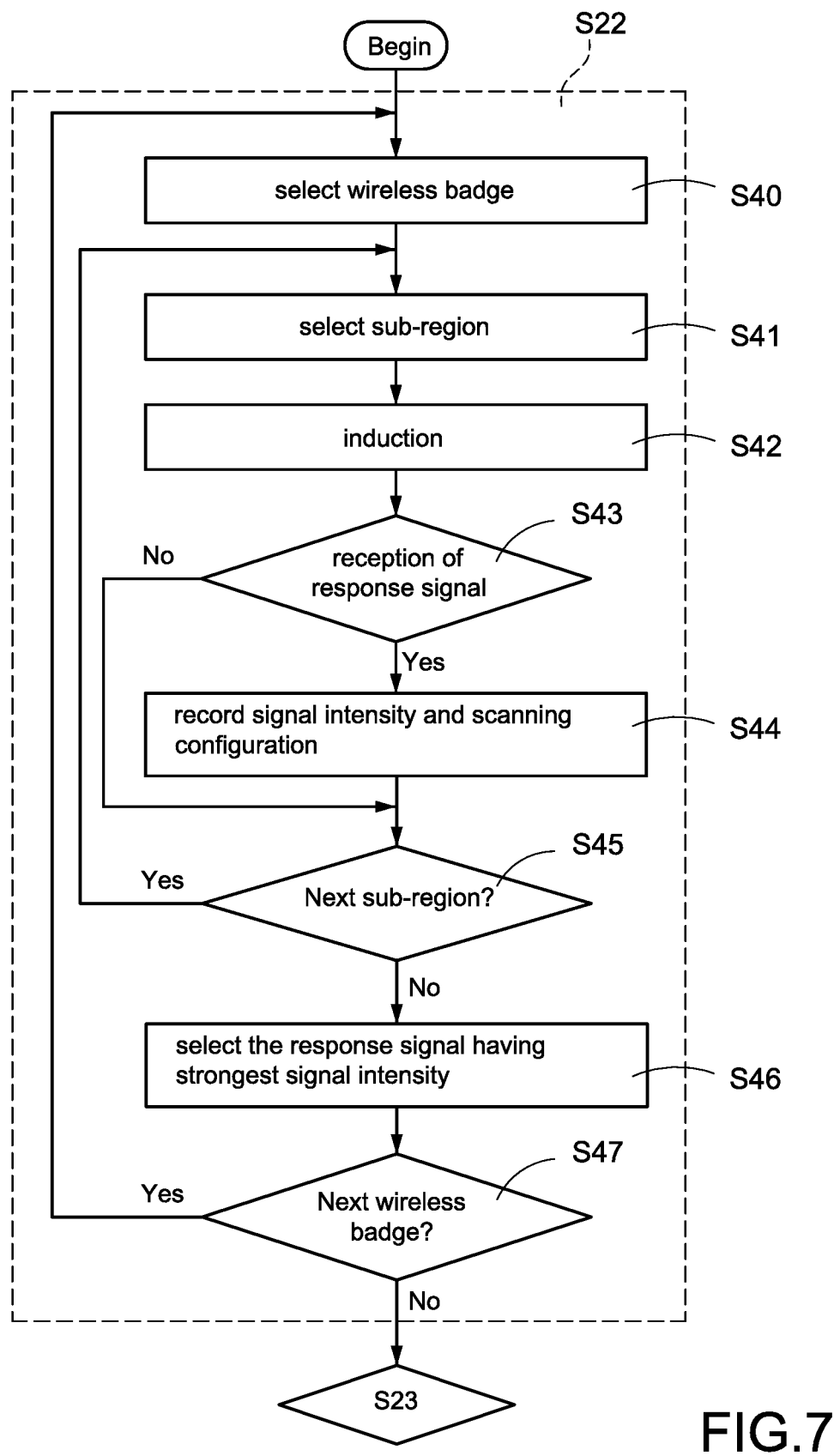
FIG. 7 is a partial flowchart of a method of automatically recognizing identity of object according to the fourth embodiment of the present disclosed example.

Please refer to FIG. 5, FIG. 6 and FIG. 7 simultaneously, FIG. 7 is a partial flowchart of a method of automatically recognizing identity of object according to the fourth embodiment of the present disclosed example. Compare to the recognizing method of FIG. 6, the recognizing method of this embodiment may further execute induction on one wireless badge each time for reducing interference and improving positioning accuracy. The step S22 of the recognizing method of this embodiment comprises following steps.

Step S40: the second control unit 121 of the scanning device 12 executes the first time scanning on all of the sub-regions of the monitoring region for retrieving a plurality of response signals (first response signals) returned from all of the wireless badges in the monitoring region, and analyzes the first response signal to retrieve the identity data and a number of all of the wireless badge in the monitoring region. Then, the second control unit 121 selects one of the induced wireless badges (such as selecting the identity data corresponding to the wireless badge), and generates the corresponding scanning signal (only the selected wireless badge will be induced by this scanning signal and make a response during second time scanning).

Then, the second control unit 121 performs step S41-S46 to execute the second time scanning on each sub-region according to the generated scanning signal for receiving one or more response signal (second response signal) from the selected wireless badge. Moreover, when the second control unit 121 receives a plurality of response signals from the selected wireless badge during the second time scanning, the second control unit 121 may select the response signal having the strongest signal intensity for follow-up.

Steps S41 to S46 shown in FIG. 7 are respectively the same or similar as steps S30 to S35 shown in FIG. 6, the relevant description is omitted for brevity. Then, step S47 is performed.

Step S47: the second control unit 121 determines whether all of the wireless badges had been scanned completely, such as determining whether all of the identity data had been selected for scanning.

If the second control unit 121 determines all of the wireless badges had been scanned completely, the second control unit 121 performs step S23. Otherwise, the second control unit 121 performs step S40 again for selecting another wireless badge (namely another identity data) to continue to scan.

The present disclosed example can effectively reduce the radio frequency interference via scanning only one wireless badge each time, and improve scanning accuracy.

Figure 8A:
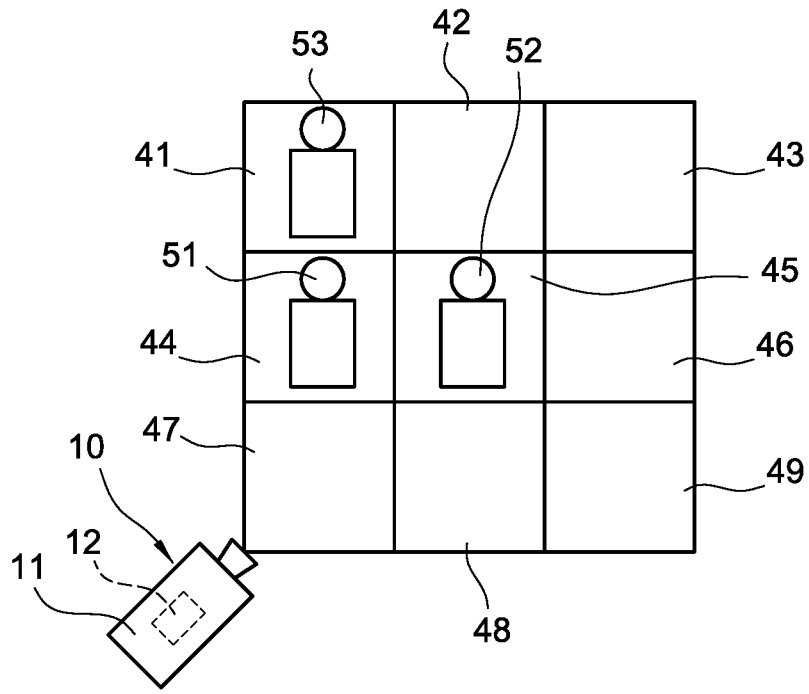
FIG. 8A is a first schematic view of recognizing identity of object according to one of embodiments of the present disclosed example.
Figure 8B:
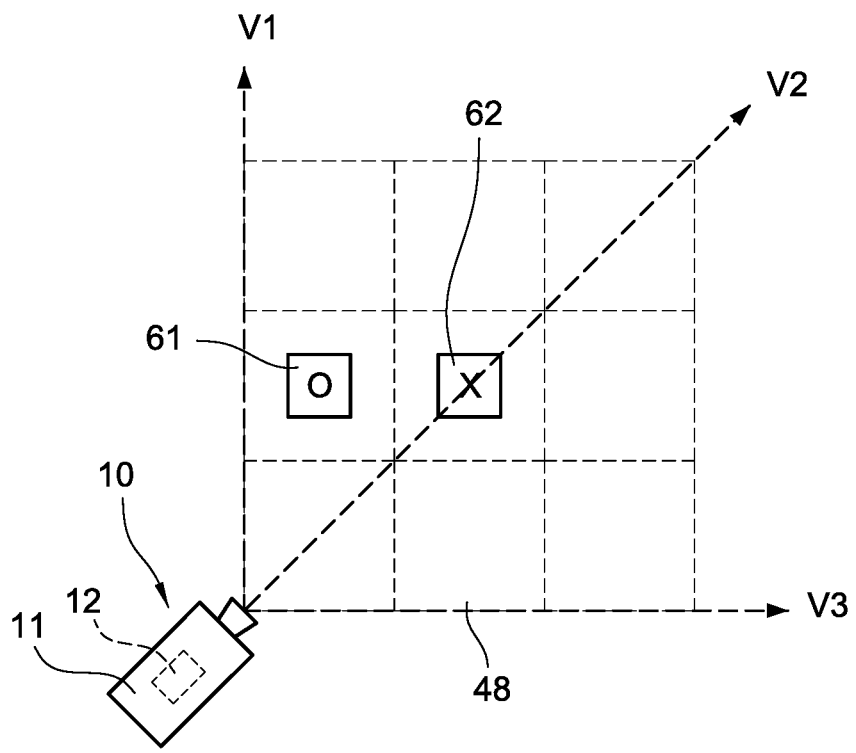
FIG. 8B is a second schematic view of recognizing identity of object according to one of embodiments of the present disclosed example.
Figure 8C:
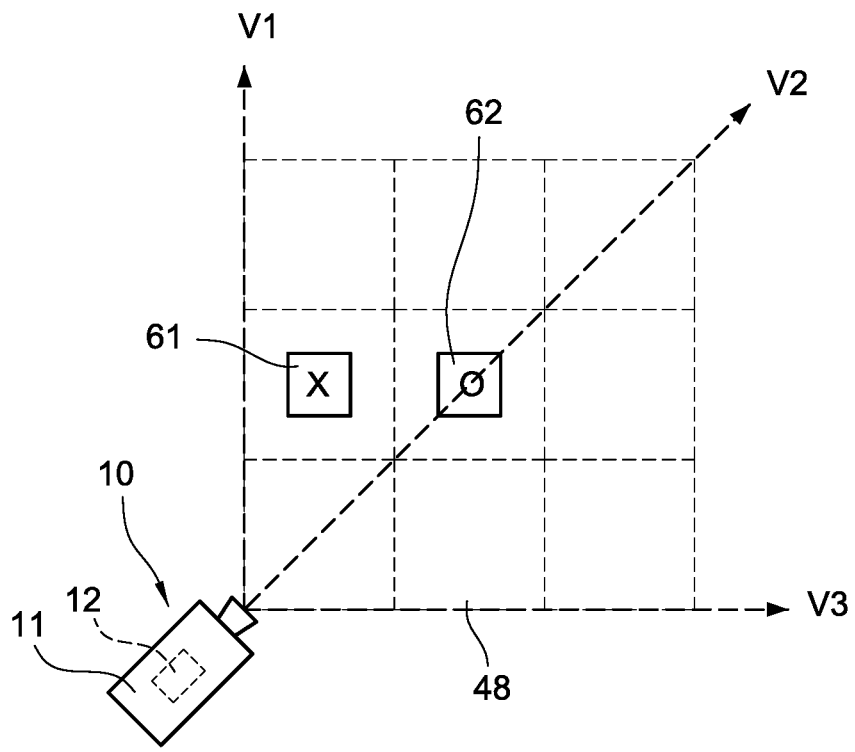
FIG. 8C is a third schematic view of recognizing identity of object according to one of embodiments of the present disclosed example.
Figure 8D:
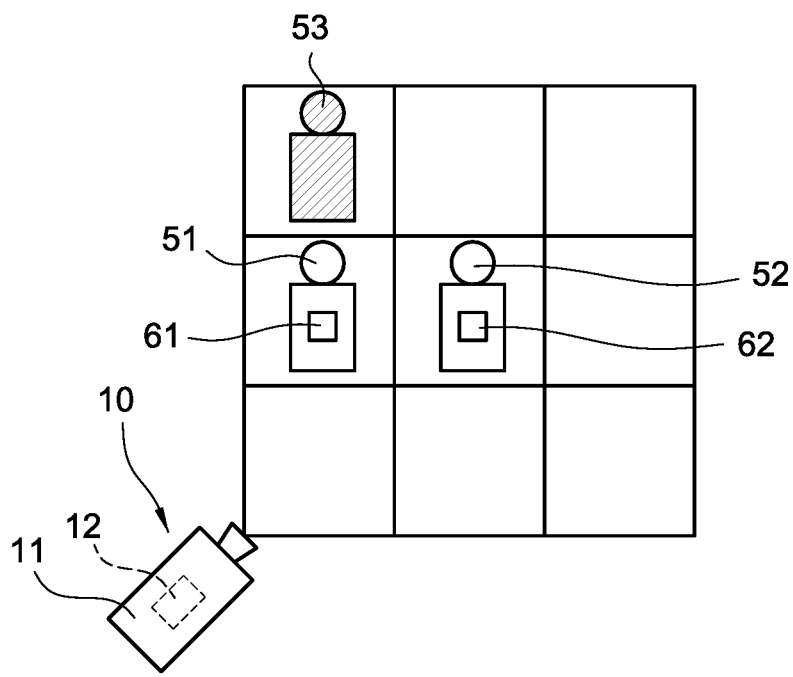
FIG. 8D is a fourth schematic view of recognizing identity of object according to one of embodiments of the present disclosed example.

Please refer to FIG. 8A to FIG. 8D simultaneously, FIG. 8A is a first schematic view of recognizing identity of object according to one of embodiments of the present disclosed example, FIG. 8B is a second schematic view of recognizing identity of object according to one of embodiments of the present disclosed example, FIG. 8C is a third schematic view of recognizing identity of object according to one of embodiments of the present disclosed example; and FIG. 8D is a fourth schematic view of recognizing identity of object according to one of embodiments of the present disclosed example.

As shown in FIG. 8A, in this example, the monitoring region comprises nine sub-regions 41-49. The recognizing system 10 may shoot the monitoring image by the image capture device 11, and determine that there is an object 53 in the sub-region 41, an object 51 in the sub-region 44 and an object 42 in the sub-region 45 after recognition.

Then, as shown in FIG. 8B, the recognizing system 10 may execute the first time scanning and determine that there are two wireless badges 61 and 62 in the monitoring region. Then, the recognizing system 10 firstly executes the second time scanning for the wireless badge 61.

More specifically, the scanning device 12 of this example stores three scanning configurations respectively corresponding to three scanning angles V1-V3. The scanning device 12 firstly emits the scanning beam heading to the scanning angle V1 according to the first scanning configuration, emits the scanning beam heading to the scanning angle V2 according to the second scanning configuration, and emits the scanning beam heading to the scanning angle V3 according to the third scanning configuration. Thus, the second time scanning is completed.

Besides, during the second time scanning, only the wireless badge 61 will be induced by the scanning beam emitted from the scanning device 12, and return the response signal (second response signal).

Please be noted that, when the scanning device 12 emits the scanning beam heading to the scanning angle V1, the wireless badge 61 will be induced and return the response signal. Besides, when the scanning device 12 emits the scanning beam heading to the different scanning angle V2, the wireless badge 61 will be induced by the spillover wave of the scanning beam and return another unexpected response signal. According to this status, in this example, the scanning device 12 is configured to select the response signal having the strongest signal intensity (take the response signal corresponding to the scanning angle V1 for example) and keep it when receiving the two response signals from the wireless badge 61.

Then, the recognizing system 10 may search the lookup table according to the first scanning configuration and the signal intensity of this response signal, and determining that the badge position of the wireless badge 61 is sub-region 44.

Then, as shown in FIG. 8C, the recognizing system 10 may execute the third time scanning to respectively emit the scanning beam heading to the scanning angles V1-V3 according to the three scanning configurations.

Besides, during the third time scanning, only the wireless badge 62 will be induced by the scanning beam emitted from the scanning device 12, and return the response signal (second response signal).

Moreover, when the scanning device 12 receives a plurality of response signals from the selected wireless badge 62 during the third time scanning, the scanning device 12 may select the response signal having the strongest signal intensity (take the response signal corresponding to the scanning angle V2 for example) for follow-up.

Then, the recognizing system 10 may search the lookup table according to the second scanning configuration and the signal intensity of this response signal, and determining that the badge position of the wireless badge 62 is sub-region 45.

Then, as shown in FIG. 8D, the recognizing system 10 pairs the object 51 with the wireless badge 61 which is located at the same sub-region as the object 51, and pairs the object 52 with the wireless badge 62 which is located at the same sub-region as the object 52.

Moreover, the recognizing system may further mark the object 53 which do not be paired with any wireless badge, and remind the administrator that an unregistered object 53 is detected by the human-machine interface. Thus, the present disclosed example can execute the identification of an object's identity accurately.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A method of automatically recognizing identity of object, comprising following steps:

a) retrieving a monitoring image by shooting a monitoring region with an image capture device, and recognizing an object image in the monitoring image;

b) retrieving identity data of a wireless badge by scanning the monitoring region with a scanning device;

c) determining an image position of the object image in the monitoring region;

d) determining a badge position of the wireless badge in the monitoring region; and e) determining whether the image position and the badge position match with each other, wherein the step b) comprises a step b2) executing induction on a plurality of sub-regions of the monitoring region individually for receiving a plurality of first response signals from a plurality of wireless badges, wherein each first response signal comprises the identity data of each wireless badge;

after the step b2), following steps performed before the step d):

f1) selecting one of the wireless badges;

f2) executing induction on the sub-regions individually according to a plurality of scanning configurations and the identity data of the currently selected wireless badge for receiving a second response signal from the currently selected wireless badge;

f3) recording a signal intensity or the scanning configuration corresponding to the second response signal after receiving the second response signal; and f4) performing the step f1) to the step f3) repetitively until completion of scanning all of the wireless badges.

2. The method of automatically recognizing identity of object according to claim 1, further comprising a step g) linking the object image and the identity data together when the image position and the badge position of the wireless badge match with each other.

3. The method of automatically recognizing identity of object according to claim 1, wherein the step c) is performed to configure the sub-region which the object image is located as the image position;

the step d) is performed to configure the sub-region which the wireless badge is located as the badge position;

the step e) is performed to determine whether the object image and the wireless badge are in the same sub-region.

4. The method of automatically recognizing identity of object according to claim 3, wherein the step b2) is performed to receive the second response signals of the same wireless badge, the second response signals of the same wireless badge are respectively induced when inducing the different sub-regions;

the step d) is performed to configure the sub-region inducing the second response signal with strongest signal intensity as the badge position.

5. The method of automatically recognizing identity of object according to claim 1, wherein the scanning device comprises a phase array antenna module and a beam-controlling module, the scanning configurations respectively correspond to a plurality of scanning angles;

the step f3) is performed to control the phase array antenna module and the beam-controlling module to emit a scanning beam at each scanning angle whereby only the currently selected wireless badge induces the scanning beam and return the second response signal.

6. The method of automatically recognizing identity of object according to claim 1, wherein the step d) comprises following steps:

d11) retrieving a lookup table, wherein the lookup table records a mapping relationship between the sub-regions and the different signal intensities; and d12) determining the sub-region which each wireless badge is located according to the lookup table and each signal intensity corresponding to each wireless badge, and configuring the determined sub-region as the badge position of the wireless badge.

7. The method of automatically recognizing identity of object according to claim 1, wherein the step d) comprises following steps:

d21) retrieving a lookup table, wherein the lookup table records a mapping relationship between the sub-regions and the scanning configurations; and d22) determining the sub-region which each wireless badge is located according to the lookup table and the scanning configuration corresponding to each wireless badge, and configuring the determined sub-region as the badge position of each wireless badge.

8. A system of automatically recognizing identity of object, comprising:

an image capture device used to shoot a monitoring region for obtaining a monitoring image;

a scanning device used to scan the monitoring region for retrieving identity data of a wireless badge; and a control device electrically connected to the image capture device and the scanning device, the control device comprising:

an image-recognizing module configured to recognize an object image in the monitoring image;

an image-positioning module configured to determine an image position in the monitoring region which the object image is located;

a badge-positioning module configured to determine a badge position in the monitoring region which the wireless badge is located; and a comparing module configured to determine whether the image position and the badge position match with each other, wherein the scanning device is configured to induce a plurality of sub-regions of the monitoring region individually for receiving a plurality of first response signals of a plurality of wireless badges, each first response signal comprises the identity data of each wireless badge, the scanning device executes induction on the sub-regions according to the scanning configurations and the identity data of each wireless badge for receiving a second response signal from each wireless badge, and records a signal intensity or the scanning configuration corresponding to each wireless badge after receiving the second response signal.

9. The system of automatically recognizing identity of object according to claim 8, wherein the control device further comprises a linking module, the linking module is configured to link the object image and the identity data together when the image position and the badge position match with each other.

10. The system of automatically recognizing identity of object according to claim 8, wherein the image-positioning module is configured to configure the sub-region which the object image is located as the image position;

the badge-positioning module is configured to configure the sub-region which the wireless badge is induced as the badge position;

the comparing module is configured to determine whether the object image and the wireless badge are located at the same sub-region.

11. The system of automatically recognizing identity of object according to claim 10, wherein the scanning device is configured to receive the second response signals of the same wireless badge, the second response signals of the same wireless badge are respectively induced in the different sub-regions;

the badge-positioning module is configured to configure the sub-region inducing the second response signal with the strongest signal intensity as the badge position.

12. The system of automatically recognizing identity of object according to claim 8, wherein the scanning configuration respectively correspond to a plurality of scanning angles, the scanning device comprises:

a phase array antenna module used to emit a scanning beam and receive a signal transmitted from the wireless badge; and a beam-controlling module connected to the phase array antenna module, the beam-controlling module being used to control the phase array antenna module to emit a scanning beam at each scanning angle according to each scanning configuration and the identity data of each wireless badge, whereby only the designated wireless badge induces the scanning beam and return the second response signal.

13. The system of automatically recognizing identity of object according to claim 8, further comprising a storage device electrically connected to the control device, the storage device storing a lookup table, the lookup table records a mapping relationship between the sub-regions and the signal intensities;

the badge-positioning module is configured to determine the sub-region which each wireless badge is located according to the lookup table and the signal intensity corresponding to each wireless badge, and configure the determined sub-region as the badge position.

14. The system of automatically recognizing identity of object according to claim 8, further comprising a storage device electrically connected to the control device, the storage device storing a lookup table, the lookup table recording a mapping relationship between the sub-regions and the scanning configurations;

the badge-positioning module is configured to determine the sub-region which each wireless badge is located according to the lookup table and the scanning configuration corresponding to each wireless badge, and configure the determined sub-region as the badge position.

* * * * *